(12) United States Patent
Whitehouse et al.

(10) Patent No.: US 9,419,997 B2
(45) Date of Patent: Aug. 16, 2016

(54) SYSTEM AND METHOD FOR CONTROLLING APPLICATIONS TO MITIGATE THE EFFECTS OF MALICIOUS SOFTWARE

(71) Applicant: BlackBerry Limited, Waterloo (CA)

(72) Inventors: Oliver Whitehouse, Surrey (GB); Michael Grant Kirkup, Waterloo (CA); Christopher Lyle Bender, Kitchener (CA); Michael Kenneth Brown, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 14/473,485

(22) Filed: Aug. 29, 2014

(65) Prior Publication Data
US 2014/0373155 A1    Dec. 18, 2014

Related U.S. Application Data

(63) Continuation of application No. 12/806,737, filed on Aug. 19, 2010, now Pat. No. 8,839,421.

(60) Provisional application No. 61/238,345, filed on Aug. 31, 2009.

(51) Int. Cl.
*H04L 29/06*    (2006.01)
*G06F 21/53*    (2013.01)
*G06F 21/56*    (2013.01)

(52) U.S. Cl.
CPC .............. *H04L 63/145* (2013.01); *G06F 21/53* (2013.01); *G06F 21/56* (2013.01); *H04L 63/14* (2013.01)

(58) Field of Classification Search
CPC .......... G06F 21/56; G06F 21/53; H04L 63/14
USPC ........................................................... 726/24
See application file for complete search history.

(56) References Cited

U.S. PATENT DOCUMENTS

| | | |
|---|---|---|
| 5,311,591 A | 5/1994 | Fischer |
| 6,775,780 B1 | 8/2004 | Muttik |
| 6,842,861 B1 | 1/2005 | Cox et al. |

(Continued)

FOREIGN PATENT DOCUMENTS

| | | |
|---|---|---|
| CA | 2714223 | 2/2011 |
| CN | 101425016 A | 5/2009 |

(Continued)

OTHER PUBLICATIONS

Communication Pursuant to Article 94(3) EPC issued in EP Application No. 10173426.7 on Feb. 13, 2015; 5 pages.

(Continued)

*Primary Examiner* — Ellen Tran
(74) *Attorney, Agent, or Firm* — Fish & Richardson P.C.

(57) ABSTRACT

Methods and systems for mitigating the effects of a malicious software application are disclosed. A dedicated module on the computing device receives from a malicious software detector a message indicating whether the application is malicious or has a malicious component. The dedicated module obtains a set of permissions to be granted to the application, and instructs software on the computing device that controls the permissions of the application to grant the set of permissions.

17 Claims, 10 Drawing Sheets

(56) References Cited

U.S. PATENT DOCUMENTS

| | | | |
|---|---|---|---|
| 2001/0020272 | A1 | 9/2001 | Le Pennec et al. |
| 2002/0019941 | A1 | 2/2002 | Chan et al. |
| 2004/0073810 | A1 | 4/2004 | Dettinger et al. |
| 2004/0123117 | A1* | 6/2004 | Berger .............. H04L 63/1408 713/188 |
| 2004/0148514 | A1 | 7/2004 | Fee et al. |
| 2004/0199763 | A1 | 10/2004 | Freund |
| 2006/0021029 | A1 | 1/2006 | Brickell et al. |
| 2006/0184792 | A1* | 8/2006 | Berlin .................... G06F 21/51 713/165 |
| 2006/0230451 | A1 | 10/2006 | Kramer et al. |
| 2006/0236393 | A1 | 10/2006 | Kramer |
| 2008/0256636 | A1 | 10/2008 | Gassoway |
| 2009/0031402 | A1 | 1/2009 | Jung et al. |
| 2010/0042931 | A1 | 2/2010 | Dixon et al. |
| 2011/0214184 | A1 | 9/2011 | Whitehouse et al. |

FOREIGN PATENT DOCUMENTS

| | | |
|---|---|---|
| CN | 102073806 | 5/2011 |
| EP | 2312485 | 4/2011 |
| WO | 0219076 A2 | 3/2002 |

OTHER PUBLICATIONS

Canadian Office Action for Canadian Patent Application No. 2,714,233, dated Jan. 9, 2014.

Chinese Rejection Decision for Chinese Patent Application No. 201010269909.9, dated Jan. 22, 2014.

Second Office Action mailed Jun. 13, 2013, in corresponding Chinese Patent Application No. 201010269909.9.

English machine translation of CN101425016, published on May 6, 2009.

Office Action mailed Jan. 29, 2013, in corresponding Canadian patent application No. 2,714,223.

Response to Examination Report dated Feb. 20, 2013, in corresponding European patent application No. 10173426.7.

Office Action mailed Dec. 4, 2012, in corresponding Chinese patent application No. 201010269909.9.

English translation of Office Action mailed Dec. 4, 2012, in corresponding Chinese patent application No. 201010269909.9.

Communication pursuant to Article 94(3) EPC in corresponding European Application No. 10173426.7, dated Oct. 22, 2012.

Extended European Search Report mailed Feb. 3, 2011, in corresponding European patent application No. 10173426.7.

Noting of loss of rights pursuant to Rule 112(1) EPC mailed Nov. 30, 2011, in corresponding European patent application No. 10173426.7.

Response filed on Jan. 27, 2012, in corresponding European patent application No. 10173426.7.

Decision on the request for further processing under Rule 135(3) EPC mailed Mar. 9, 2012, in corresponding European patent application No. 10173426.7.

IOLO Technologies, LLC.; "Iolo Personal Firewall™"; Retrieved from internet Sep. 2009; http://www.iolo.com/help/fw/Intellidenfense_Described.htm.

Check Point Software Technologies, LTD.; "PureSecurity Web Intelligence"; Retrieved from internet Sep. 2009; http://france.checkpoint.com/uploads/datasheets/EN_web_intelligence.pdf.

Research in Motion Limited; "BlackBerry Internet Service: Security Feature Overview, Version 2.7"; 2009; Retrieved from Internet Sep. 2009.

Mezodi, S.; Search Report from corresponding European Application No. 10173426.7; search completed Jan. 21, 2011.

Non-Final Office Action mailed May 11, 2012, in corresponding U.S. Appl. No. 12/806,737.

Response filed on Aug. 13, 2012, in corresponding U.S. Appl. No. 12/806,737.

Final Office Action mailed Oct. 23, 2012, in corresponding U.S. Appl. No. 12/806,737.

Response filed on Dec. 26, 2012, in corresponding U.S. Appl. No. 12/806,737.

Request for Continued Examination (RCE) filed on Dec. 26, 2012, in corresponding U.S. Appl. No. 12/806,737.

Examiner-Initiated Interview Summary conducted on Apr. 25, 2014, in corresponding U.S. Appl. No. 12/806,737.

Notice of Allowance mailed May 13, 2014, in corresponding U.S. Appl. No. 12/806,737.

English abstract for CN10273806; published on May 25, 2011 and retrieved on Aug. 29, 2014.

Office Action issued in Canadian Application No. 2,714,223 dated Dec. 5, 2014; 4 pages.

* cited by examiner

SYSTEM AND METHOD FOR CONTROLLING APPLICATIONS TO MITIGATE THE EFFECTS OF MALICIOUS SOFTWARE

CROSS-REFERENCE TO RELATED APPLICATIONS

This application is a continuation of U.S. patent application Ser. No. 12/806,737, filed Aug. 19, 2010, which claims the benefit of U.S. Provisional Application No. 61/238,345 filed on Aug. 31, 2009. The entire contents of U.S. application Ser. No. 12/806,737 and U.S. Application No. 61/238,345 are hereby incorporated by reference.

TECHNICAL FIELD

The following relates generally to detecting and mitigating the effects of malicious software.

BACKGROUND

Malicious software is software that is designed to infiltrate or damage a computing system. Examples of malicious software include viruses, worms, trojans, and spyware. Often malicious software is embedded in what appears to be a legitimate software application. When a user downloads, installs, and/or executes the software application, they are additionally or instead inadvertently downloading, installing, and/or executing the malicious software.

For example, an interloper may infect the software code of a legitimate application available for download on a personal computer or a communication device. A user may then download and install the infected software application thinking that they are obtaining the legitimate version of the application. The malicious software in the application may then attempt to conceal itself and secretly perform damaging or unwanted activities ranging from corrupting and/or deleting files to displaying pop-up ads to collecting and sending information over a network.

As a specific example, a system administrator may permit users of wireless handheld devices to download a legitimate software application comprising a poker game that can be played on the device. An interloper may infect the software code of the poker game to embed spyware that collects GPS information on the location of the user's device and sends this information to the interloper over the wireless network. A user may then inadvertently download and install the infected version of the poker game application believing that they are downloading and installing the legitimate uninfected application. The infected poker game application may appear to operate as expected; however, unbeknownst to the user, the spyware infected in the application is collecting and transmitting the user's GPS information.

There is a desire to mitigate the effects of malicious software applications.

BRIEF DESCRIPTION

Embodiments will now be described by way of example only with reference to the accompanying drawings, in which.

DETAILED DESCRIPTION

Figure 1:
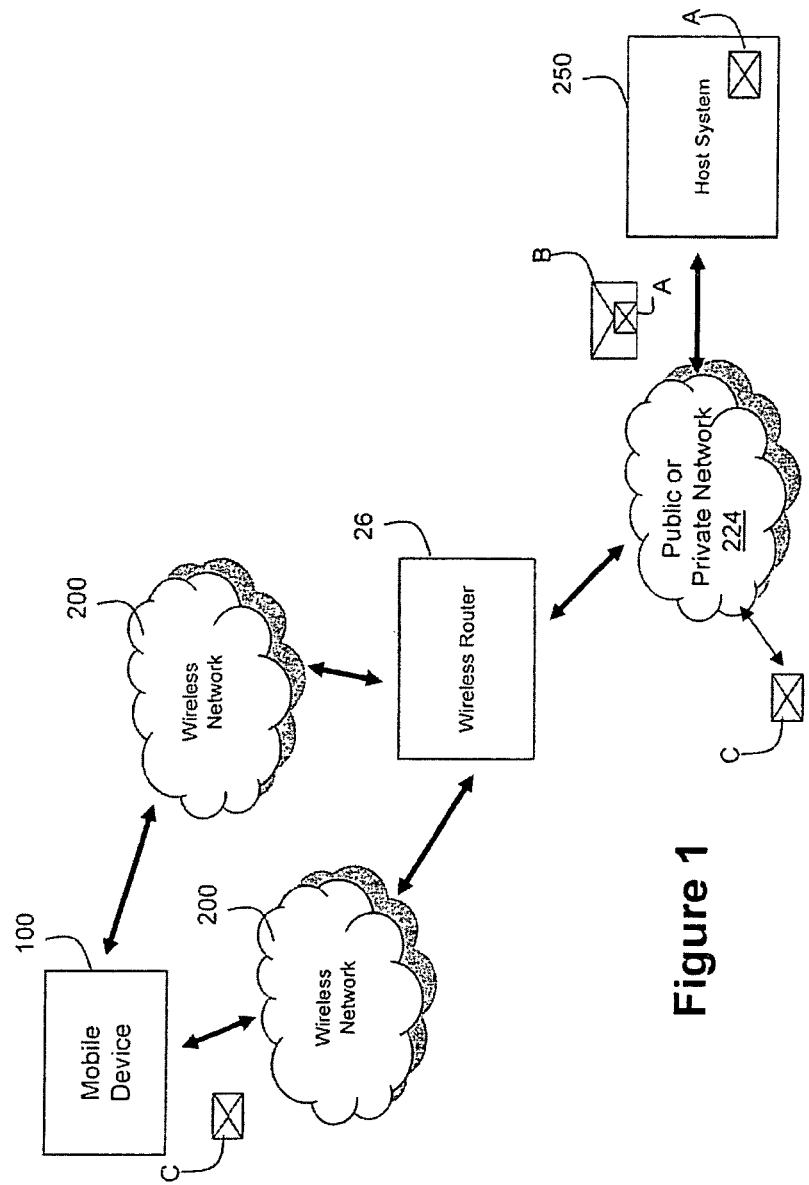
FIG. 1 is a system diagram illustrating the environment in which data items are pushed from a host system to a mobile device.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

In general, it has been recognized that a computing device can include a designated software module referred to as a security decision module to receive information from a trusted application that detects malicious software and to then use this information to control the permissions granted to software applications. This enables the security decision module to inhibit specific permissions granted to applications that are believed to be malicious and/or, if applicable, to ensure the permissions granted to the software applications correspond to permissions the malicious software detector has granted. For example, if it is suspected that a software application may be malicious or have a malicious component, the security decision module can actively inhibit permissions normally granted to the application. As an example, the security decision module may inhibit the application from sending or receiving information over the network or accessing specific types of data on the device (such as email text or GPS data).

In the following embodiments, the computing device will be assumed to be a mobile device, however, the principles are equally applicable to other devices. Examples of applicable mobile devices include pagers, cellular phones, cellular smart-phones, wireless organizers, personal digital assistants, computers, laptops, handheld wireless communication devices, wirelessly enabled notebook computers and the like.

A mobile device may be considered a two-way communication device with advanced data communication capabilities including the capability to communicate with other mobile devices or computer systems through a network of transceiver stations. The mobile device may also have the capability to allow voice communication. Depending on the functionality provided by the mobile device, it may be referred to as a data messaging device, a two-way pager, a cellular telephone with data messaging capabilities, a wireless Internet appliance, or a data communication device (with or without telephony capabilities).

The mobile device may be one that is used in a system that is configured for continuously routing all forms of pushed information from a host system to the mobile device. One example of such a system will now be described.

Referring now to the drawings, FIG. 1 is an example system diagram showing the redirection of user data items (such as message A or C) from a corporate enterprise computer system (host system) 250 to the user's mobile device 100 via a wireless router 26. The wireless router 26 provides the wireless connectivity functionality as it acts to both abstract most of the wireless network's 200 complexities, and it also implements features necessary to support pushing data to the mobile device 100. Although not shown, a plurality of mobile devices may access data from the host system 250. In this example, message A in FIG. 1 represents an internal message sent from, e.g. a desktop computer within the host system 250, to any number of server computers in the corporate network (e.g. LAN), which may, in general, include a database server, a calendar server, an E-mail server or a voice-mail server.

Message C in FIG. 1 represents an external message from a sender that is not directly connected to the host system 250, such as the user's mobile device 100, some other user's mobile device (not shown), or any user connected to the public or private network 224 (e.g. the Internet). Message C could be e-mail, voice-mail, calendar information, database updates, web-page updates or could even represent a command message from the user's mobile device 100 to the host system 250. The host system 250 may comprise, along with the typical communication links, hardware and software associated with a corporate enterprise computer network system, one or more wireless mobility agents, a TCP/IP connection, a collection of datastores, (for example a data store for e-mail could be an off-the-shelf mail server like Microsoft Exchange® Server or Lotus Notes® Server), all within and behind a corporate firewall.

The mobile device 100 may be adapted for communication within wireless network 200 via wireless links, as required by each wireless network 200 being used. As an illustrative example of the operation for a wireless router 26 shown in FIG. 1, consider a data item A, repackaged in outer envelope B (the packaged data item A now referred to as "data item (A)") and sent to the mobile device 100 from an Application Service Provider (ASP) in the host system 250. Within the ASP is a computer program, similar to a wireless mobility agent, running on any computer in the ASP's environment that is sending requested data items from a data store to a mobile device 100. The mobile-destined data item (A) is routed through the network 224, and through a firewall protecting the wireless router 26.

Although the above describes the host system 250 as being used within a corporate enterprise network environment, this is just one embodiment of one type of host service that offers push-based messages for a handheld wireless device that is capable of notifying and preferably presenting the data to the user in real-time at the mobile device when data arrives at the host system.

By offering a wireless router 26 (sometimes referred to as a "relay"), there are a number of advantages to both the host system 250 and the wireless network 200. The host system 250 in general runs a host service that is considered to be any computer program that is running on one or more computer systems. The host service is said to be running on a host system 250, and one host system 250 can support any number of host services. A host service may or may not be aware of the fact that information is being channeled to mobile devices 100. For example an e-mail or message program 138 (see FIG. 2) might be receiving and processing e-mail while an associated program (e.g. an e-mail wireless mobility agent) is also monitoring the mailbox for the user and forwarding or pushing the same e-mail to a wireless device 100. A host service might also be modified to prepare and exchange information with mobile devices 100 via the wireless router 26, like customer relationship management software. In a third example, there might be a common access to a range of host services. For example a mobility agent might offer a Wireless Access Protocol (WAP) connection to several databases.

The host system 250 shown herein has many methods when establishing a communication link to the wireless router 26. For one skilled in the art of data communications the host system 250 could use connection protocols like TCP/IP, X.25, Frame Relay, ISDN, ATM or many other protocols to establish a point-to-point connection. Over this connection there are several tunneling methods available to package and send the data, some of these include: HTTP/HTML, HTTP/XML, HTTP/Proprietary, FTP, SMTP or some other proprietary data exchange protocol. The type of host systems 250 that might employ the wireless router 26 to perform push could include: field service applications, e-mail services, stock quote services, banking services, stock trading services, field sales applications, advertising messages and many others. This wireless network 200 abstraction is made possible by the wireless router 26, which implements this routing and push functionality. The type of user-selected data items being exchanged by the host could include: E-mail messages, calendar events, meeting notifications, address entries, journal entries, personal alerts, alarms, warnings, stock quotes, news bulletins, bank account transactions, field service updates, stock trades, heart-monitoring information, vending machine stock levels, meter reading data, GPS data, etc., but could, alternatively, include any other type of message that is transmitted to the host system 250, or that the host system 250 acquires through the use of intelligent agents, such as data that is received after the host system 250 initiates a search of a database or a website or a bulletin board.

The wireless router 26 provides a range of services to make creating a push-based host service possible. Examples of wireless networks protocols for communicating between mobile device 100 and wireless router 26 include: (1) Code Division Multiple Access (CDMA), (2) the Groupe Special Mobile or the Global System for Mobile Communications (GSM) and the General Packet Radio Service (GPRS), and (3) the upcoming third-generation (3G) and fourth generation (4G) network protocols like EDGE, UMTS and HSDPA, LTE, Wi-Max etc. Some older examples of data-centric networks include, but are not limited to: (1) the Mobitex Radio Network ("Mobitex") and (2) the DataTAC Radio Network ("DataTAC").

To be effective in providing push services for host systems 250, the wireless router 26 may implement a set of defined functions. It can be appreciated that one could select many different hardware configurations for the wireless router 26, however, many of the same or similar set of features would likely be present in the different configurations.

Figure 2:
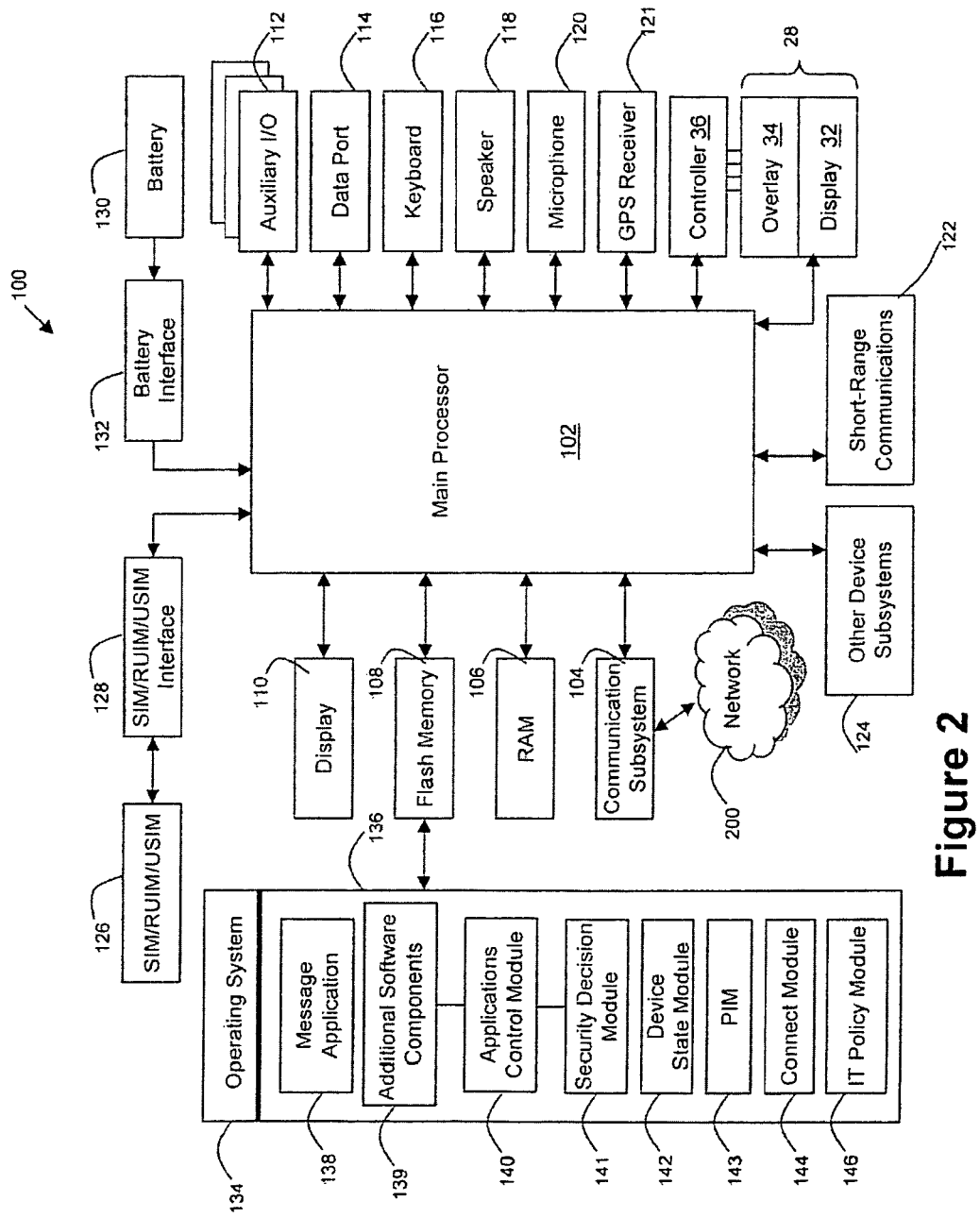
FIG. 2 is a block diagram of an example embodiment of a mobile device.

Referring next to FIG. 2, shown therein is a block diagram of an example embodiment of a mobile device 100. The mobile device 100 comprises a number of components such as a main processor 102 that controls the overall operation of the mobile device 100. Communication functions, including data and voice communications, are performed through a communication subsystem 104. The communication subsystem 104 receives messages from and sends messages to each wireless network 200. Each wireless link connecting the communication subsystem 104 with each wireless network 200 represents one or more different Radio Frequency (RF) channels, operating according to defined protocols specified for the particular network.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, a GPS receiver 121, short-range communications 122, and other device subsystems 124.

Some of the subsystems of the mobile device 100 perform communication-related functions, whereas other subsystems may provide "resident" or on-device functions. By way of example, the display 110 and the keyboard 116 may be used for both communication-related functions, such as entering a text message for transmission over a network 200, and device-resident functions such as a calculator or task list.

The mobile device 100 can send and receive communication signals over a wireless network 200 after required network registration or activation procedures have been completed. Network access is associated with a subscriber or user of the mobile device 100. To identify a subscriber, the mobile device 100 may use a subscriber module component or "smart card" 126, such as a Subscriber Identity Module (SIM), a Removable User Identity Module (RUIM) and a Universal Subscriber Identity Module (USIM). In the example shown, a SIM/RUIM/USIM 126 is to be inserted into a SIM/RUIM/USIM interface 128 in order to communicate with a network. Without the component 126, the mobile device 100 is not fully operational for communication with the associated wireless network 200. Once the SIM/RUIM/USIM 126 is inserted into the SIM/RUIM/USIM interface 128, it is coupled to the main processor 102.

The mobile device 100 is a battery-powered device and therefore includes a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the mobile device 100.

The mobile device 100 also includes an operating system 134 and software components such as 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, may be installed on the mobile device 100 during its manufacture. Software applications may include a message application 138, a device state module 142, a Personal Information Manager (PIM) 143, a connect module 144 and an IT policy module 146. A message application 138 can be any suitable software program that allows a user of the mobile device 100 to send and receive electronic messages, wherein messages are typically stored in the flash memory 108 of the mobile device 100. A device state module 142 provides persistence, i.e. the device state module 142 ensures that important device data is stored in persistent memory, such as the flash memory 108, so that the data is not lost when the mobile device 100 is turned off or loses power. A PIM 143 includes functionality for organizing and managing data items of interest to the user, such as, but not limited to, e-mail, text messages, instant messages, contacts, calendar events, and voice mails, and may interact with the wireless network 200. A connect module 144 implements the communication protocols that are required for the mobile device 100 to communicate with the wireless infrastructure and any host system 250, such as an enterprise system, that the mobile device 100 is authorized to interface with. An IT policy module 146 receives IT policy data that encodes the IT policy, and may be responsible for organizing and securing rules such as the "Set Maximum Password Attempts" IT policy.

Other types of software applications or components 139 can also be installed on the mobile device 100. These software applications 139 may be pre-installed applications or third party applications, which are added after the manufacture of the mobile device 100. Examples of third party applications include games, calculators, utilities, etc.

The additional applications 139 can be loaded onto the mobile device 100 through at least one of a wireless network 200, the auxiliary I/O subsystem 112, the data port 114, the short-range communications subsystem 122, or any other suitable device subsystem 124.

The data port 114 can be any suitable port that enables data communication between the mobile device 100 and another computing device. The data port 114 can be a serial or a parallel port. In some instances, the data port 114 can be a USB port that includes data lines for data transfer and a supply line that can provide a charging current to charge the battery 130 of the mobile device 100.

For voice communications, received signals are output to the speaker 118, and signals for transmission are generated by the microphone 120. Although voice or audio signal output is accomplished primarily through the speaker 118, the display 110 can also be used to provide additional information such as the identity of a calling party, duration of a voice call, or other voice call related information.

For composing data items, such as e-mail messages, for example, a user or subscriber could use the touch-sensitive overlay 34 on the display 32 that are part of the touch screen display 28, in addition to possibly the auxiliary I/O subsystem 112. The auxiliary I/O subsystem 112 may include devices such as: a mouse, track ball, infrared fingerprint detector, or a roller wheel with dynamic button pressing capability. A composed item may be transmitted over a wireless network 200 through the communication subsystem 104.

Figure 3:
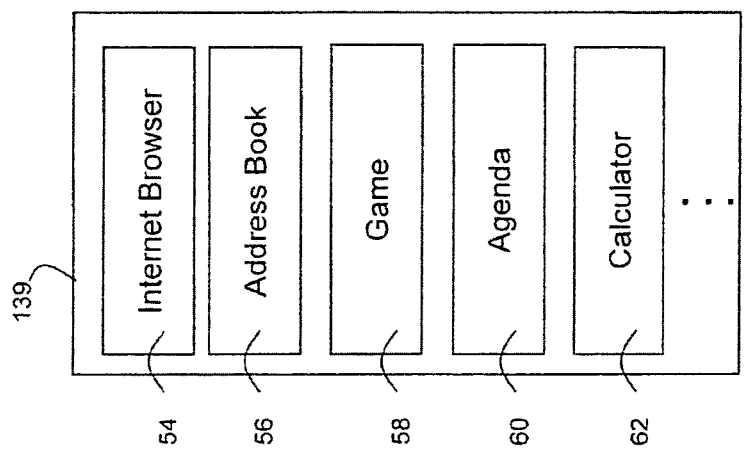
FIG. 3 is a block diagram illustrating example ones of the additional software applications and components shown in FIG. 2.

FIG. 3 shows an example of additional software applications 139 that may be stored on and used with the mobile device 100. Only examples are shown in FIG. 3 and such examples are not to be considered exhaustive. In this example, an internet browser 54, an address book 56, a game 58, an agenda 60 and a calculator application 62 are shown to illustrate the various additional applications that may be operated on the mobile device 100.

Returning to FIG. 2, an Applications Control Module 140 is utilized by the mobile device 100 to control the permissions granted to the additional applications 139. The Applications Control Module 140 is shown in greater detail in FIG. 4. It includes a database 61 which stores the permissions granted to each application 139, as well as interfacing software 63. The interfacing software 63 accesses the database 61 to set or modify the permissions granted to each application 139 and also restricts the operation of each application 139 according to the settings in the database 61.

Figure 4:
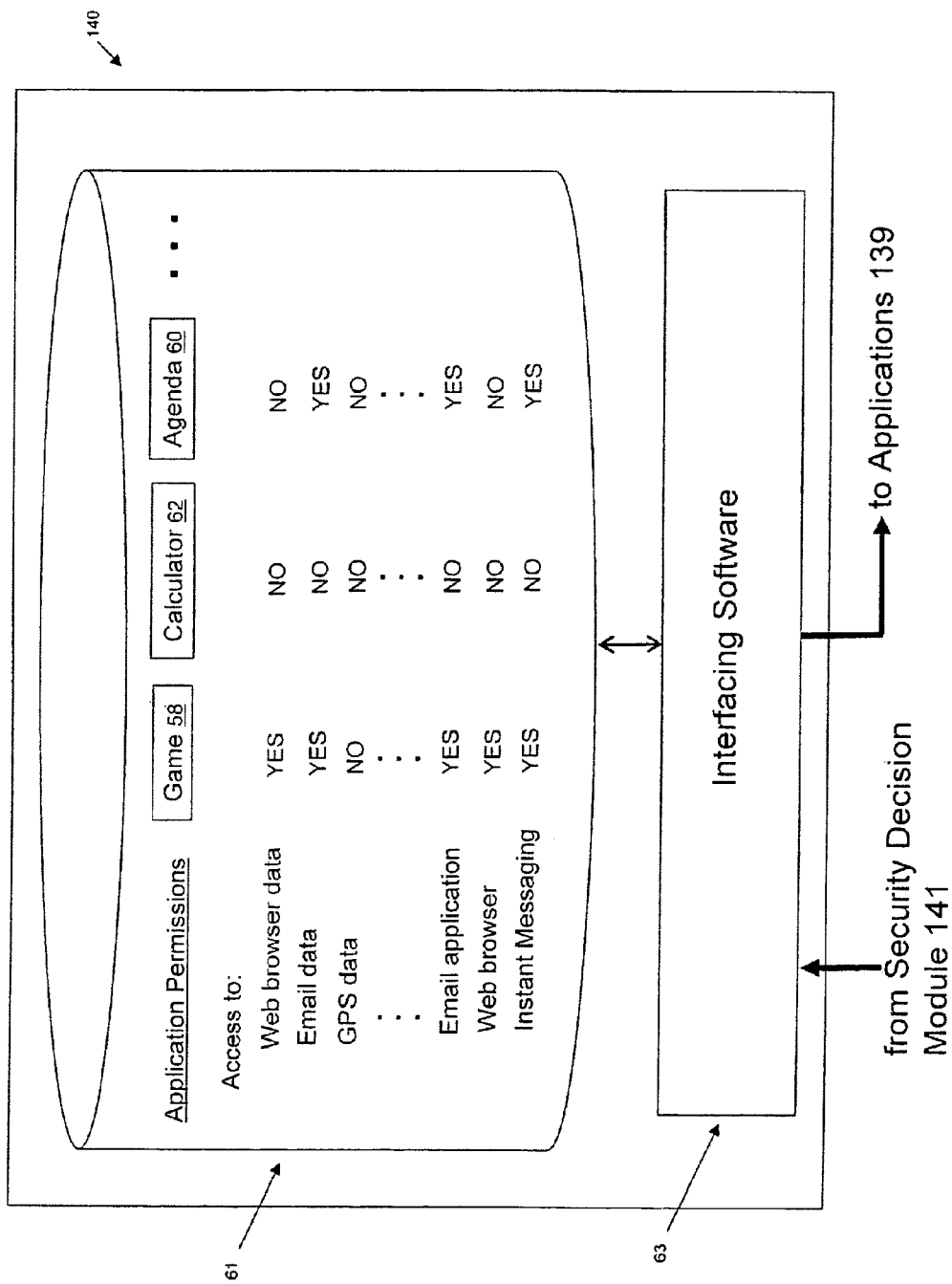
FIG. 4 is a schematic diagram of a module for controlling the permissions of applications.

FIG. 4 shows one example of possible permission settings granted to a subset of the additional applications 139. In this example, the Game application 58 is permitted to access the email, web browser, and instant messaging applications, as well as email and web browser data downloaded by the user. This is because during regular operation, the Game application 58 allows the user playing the Game application 58 to automatically email or instant message their score to other users on the network, to automatically retrieve scores and messages sent from other users, and to support online playing against other users. The Game application 58 is not permitted to access GPS data since it is not used or required during regular operation of the Game application 58. On the other hand, the Calculator application 62 only supports performing and displaying the results of mathematical operations inputted by the user. Therefore, this application is not permitted to access any of the data or applications shown in FIG. 4. The Agenda application 60 may email and instant message meeting items to other users on the network and automatically scan emails received to flag information that may require an agenda entry. Therefore, the Agenda application 60 is permitted access to email data, as well as the email and instant messaging applications.

Typically, when an application is installed on the device 100, the application requests that the Applications Control Module 140 grant a specific set of permissions. However, a system administrator and/or a user of the mobile device 100 can typically modify the application permissions granted to an application. For example, when the user downloads and installs the Game application 58, the user may be prompted during installation and asked whether the user wishes to share game scores and play against other users online. If the user indicates he/she does not want such functionality, the interfacing software 63 sets the permissions for the Game application 58 in the data base 61 to inhibit the Game application 58 from accessing email, web browser, and instant messaging applications, as well as email and web browser data.

It has been recognized that a designated module, which will be referred to as the Security Decision Module 141, can receive information from a trusted application that detects malicious software and use this information to instruct the Applications Control Module 140 to set the permissions of the applications 139. For example, if it is determined that a particular application 139 may be malicious, the Security Decision Module 141 can instruct the interfacing software 63 of the Applications Control Module 140 to modify the permissions in the database 61 to inhibit specific permissions granted to that application in order to mitigate the effects of the malicious software. This is particularly beneficial in situations in which it is determined that a particular application may be malicious or is semi-malicious, for example, when a known malicious piece of software code is not specifically identified, but it is determined that the application is suspicious or likely has a malicious component embedded within it. Such a situation may occur, for example, if the trusted application for detecting malicious software uses a heuristic technique to determine that the application is acting suspicious or to determine that the application has embedded within it a slight variation of a known malicious code. In such a situation, upon receiving this information the Security Decision Module 141 can use the Application Control Module 140 to limit the functions permitted by the application with the intent of mitigating any malicious component that may be present. Therefore, the user of the mobile device 100 is still able to operate the application, but the permissions granted to the application is controlled to mitigate any malicious component.

An example embodiment in which the Security Decision Module 141 utilizes the Application Control Module 140 to limit the permissions of an application will now be described with reference to FIGS. 5 and 6. In this embodiment, it will be assumed that a user inadvertently downloads onto the mobile device 100 an Agenda application 60 that has been infected with a malicious spyware application. The malicious spyware application attempts to conceal itself during operation of the Agenda application 60 and secretly scans emails and sends content of interest to a specific entity on the network (e.g. the network 200 and/or 224).

Figure 5:
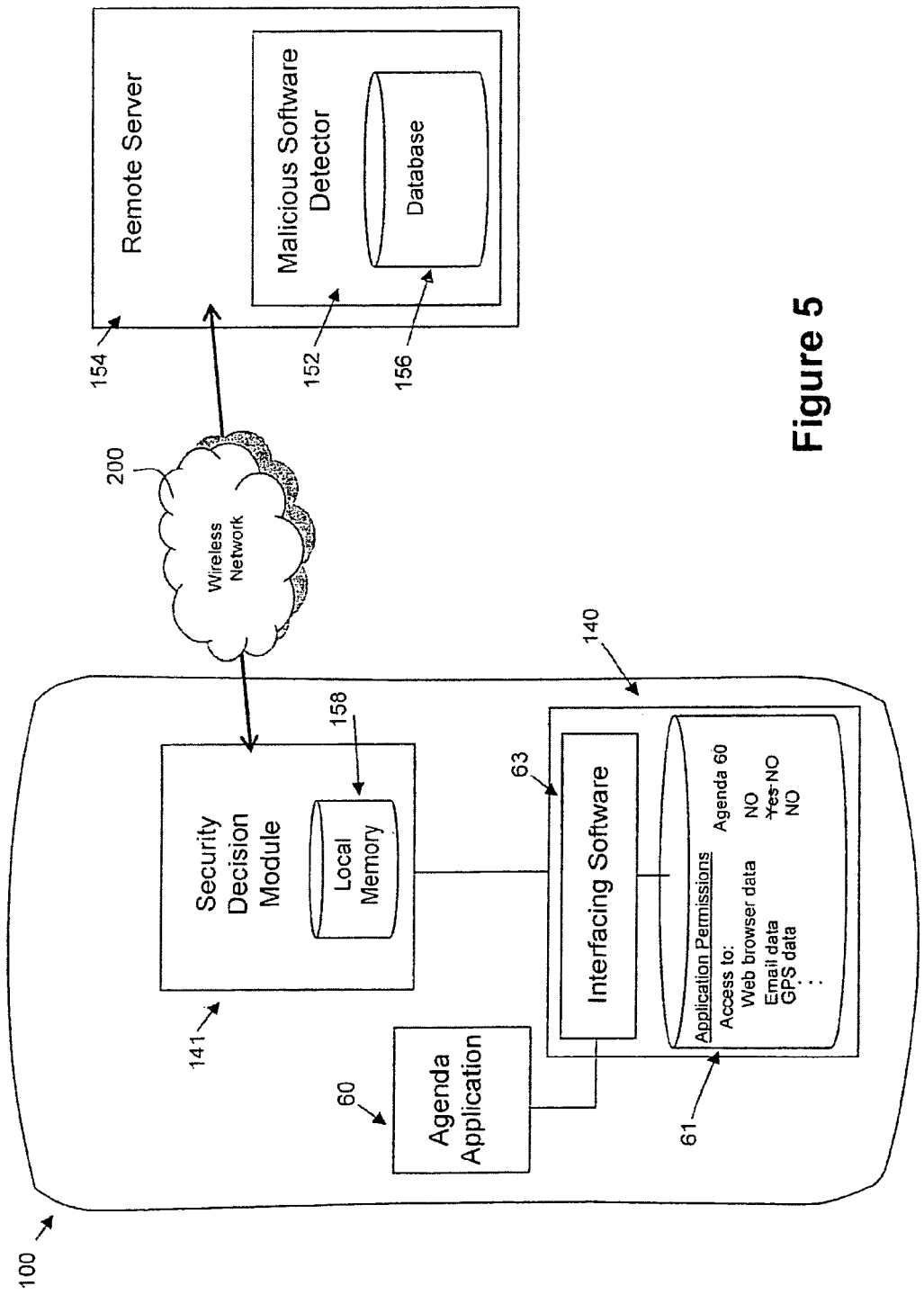
FIG. 5 is a schematic diagram of a mobile device and a remote server illustrating one embodiment of system components for mitigating the effects of malicious software.

As shown in FIG. 5, in this specific example embodiment the trusted application for detecting malicious software, which will be referred to as the Malicious Software Detector 152, does not exist on the mobile device 100 itself, but is located on a remote server 154. This is particularly advantageous in a mobile communication environment such as that shown in FIG. 1. This is because the mobile device 100 does not have to supply the memory and computational requirements necessary to run the Malicious Software Detector 152. Also, a single Malicious Software Detector 152 can remotely service a plurality of mobile devices. Mobile devices are typically constrained in terms of memory and power consumption, and in such cases generally the less computational tasks needed to be performed on the mobile device the better. As will be explained in detail below, the Security Decision Module 141 receives from the Malicious Software Detector 152 a message that indicates whether the Agenda application 60 has a malicious component and specifies what application permissions are to be granted to the Agenda application 60. The Security Decision Module 141 and the Malicious Software Detector 152 communicate with each other via the wireless network 200.

Figure 6:
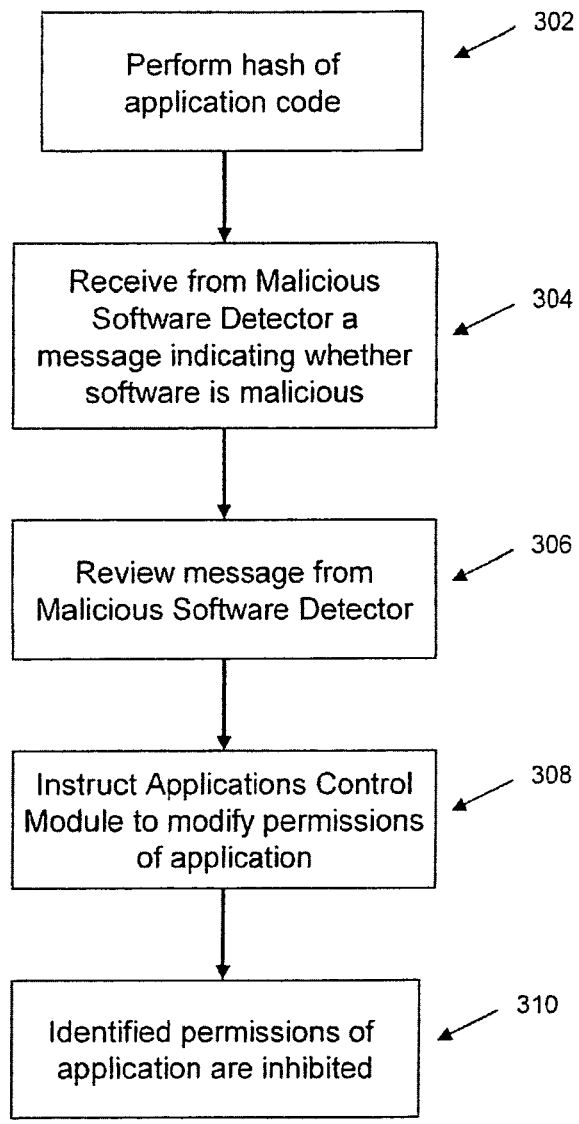
FIG. 6 is schematic diagram of a set of computer executable instructions for an embodiment for mitigating the effects of malicious software.

Turning to FIG. 6, a set of computer readable instructions is shown that are stored on the mobile device 100 and are used by the Security Decision Module 141 and the Applications Control Module 140 during operation in this embodiment.

In step 302, the Security Decision Module 141 first generates information pertaining to the Agenda application 60 and forwards this information to the Malicious Software Detector 152. In this embodiment, the information pertaining to the Agenda application 60 is a cryptographic hash of the application code of the Agenda application 60 computed by the Security Decision Module 141. However, as will be explained below, the information pertaining to the application is not limited to hash values, but can in fact be information in many different forms. For example, the information may comprise an identifying portion of the application. In another example, the information may comprise a cryptographic token such as a digital certificate uniquely identifying the application or the application author. It can be appreciated that the information may comprise any one or more of these examples.

Advantageously, the cryptographic hash is a relatively compact representation of the application code suitable for transmission over the wireless network 200 and/or for comparing against expected values. The cryptographic hash is one-way, and therefore if the application code is modified (e.g. if it is infected), the hash value will change. The hash can therefore be used, for example, to determine if an application has been infected, and in some cases the value of the hash itself can indicate which known malicious software has infected the application. An example of a cryptographic hash function that can be used is SHA-256. The cryptographic hash is transmitted to the Malicious Software Detector 152 via the wireless network 200.

The Security Decision Module 141 performs the operation of step 302 in any or all of the following situations: i) when the Agenda application 60 is first downloaded; ii) when the Agenda application 60 is installed; iii) upon the first run of the Agenda application 60; and/or iv) periodically on subsequent runs of the Agenda application 60.

Next, in step 304, the Malicious Software Detector 152 uses the information pertaining to the application (e.g. the hash value in this embodiment) to determine if the Agenda application 60 is malicious or has a malicious component. The Malicious Software Detector 152 sends back to the Security Decision Module 141 one of at least the following three responses: i) Denied—the application is not allowed to run, download, or install; ii) Allowed—the application is allowed to run, download, and install with the requested permissions; or iii) Allowed-with-Caveats—the application is allowed to run, download, and install, but with a reduced set of permissions. The Malicious Software Detector 152 may also be configured to determine if the user still has a valid license to utilize the services of the Malicious Software Detector 152, and if not, to send a response to the Security Decision Module 141 indicating that this is the case.

The specific operations performed by the Malicious Software Detector 152 in executing step 304 can be implemented in many different ways as is known in the art, and the Malicious Software Detector 152 may comprise software provided by and/or maintained by a trusted $3^{rd}$ party specializing in applications for detecting malicious software. As an example, the Malicious Software Detector 152 may use the cryptographic hash value to compare it with data values (e.g. virus signatures) stored in a database 156. If a match is found, the Malicious Software Detector 152 identifies the malicious software that has infected the Agenda application 60, and therefore knows the characteristics of the malicious software and what permissions should be inhibited to mitigate the effects of the malicious software. This information is then sent to the Security Decision Module 141.

In the specific embodiment described in FIGS. 5 and 6, it will be assumed that the Malicious Software Detector 152 determines that the Agenda application 60 has a malicious component, and that it is appropriate to still allow the Agenda application 60 to run, but with reduced permissions. The Malicious Software Detector 152 therefore sends to the Security Decision Module 141 a message that indicates that the Agenda application 60 is allowed with caveats, and the Malicious Software Detector 152 provides the Security Decision Module 141 with a reduced set of permissions that may be granted to the Agenda application 60.

In step 306, the Security Decision Module 141 reviews this message from the Malicious Software Detector 152 and obtains the permissions that are to be granted to the Agenda application 60.

Next, in step 308, the Security Decision Module 141 instructs the interfacing software 63 of the Applications Control Module 140 to set or modify the permissions granted to the Agenda application 60, which are stored in the database 61 of the Applications Control Module 140. For example, let it be assumed that because of the malicious software component embedded in the Agenda application 60, the Security Decision Module 141 instructs the Applications Control Module 140 to inhibit the Agenda application 60 from accessing email data. The interfacing software 63 therefore modifies the permissions in the database 61 to inhibit this permission from being granted to the Agenda application 60. This can be seen in FIG. 5, in which the permissions for the Agenda application 60 have been modified in the database 61 to inhibit the Agenda application 60 from accessing email data.

Subsequently, in step 310, the Agenda application 60 operates as expected, but the Application Control Module 140 now prevents the Agenda application 60 from accessing email data. The malicious software component, which attempts to scan email data for information of interest and send such information over the network is therefore mitigated.

In a variation of the embodiment described above, the Malicious Software Detector 152 may also determine if the application is unknown, and if so, inform the Security Decision Module 141. In such a scenario, the Security Decision Module 141 can be configured to either allow or quarantine the application.

Figure 7:
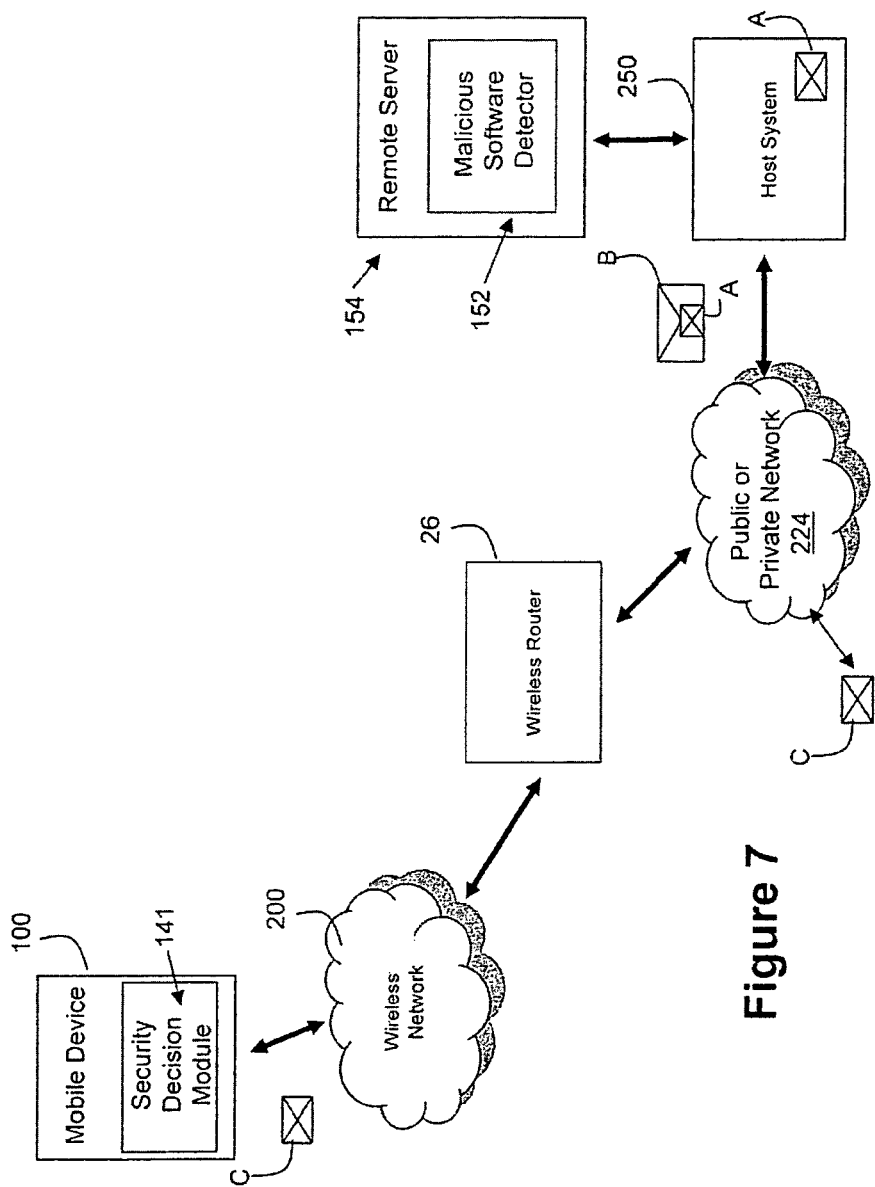
FIG. 7 is a system diagram illustrating an embodiment of system components for mitigating the effects of malicious software in the environment of FIG. 1.

In the embodiments described above, the Malicious Software Detector 152 is located on a remote server 154. Within an environment such as that described with reference to FIG. 1, the Security Decision Module 141 on the mobile device 100 may communicate with the Malicious Software Detector 152 on the remote server 154 via the host system 250. Such an embodiment is shown in FIG. 7. In the system shown in FIG. 7, when the Malicious Software Detector 152 wishes to send a message to the Security Decision Module 140, such as in step 304 of FIG. 6, the message is communicated to the host system 250. The host system then pushes the message to the mobile device 100 using the wireless router 26. Similarly, when the Security Decision Module 141 wishes to send information pertaining to an application to the Malicious Software Detector 152, such as in step 302 of FIG. 6, the information is forwarded via the networks 200 and 224 to the host system 250, which forwards the message to the remote server 154.

In an alternative embodiment to those described in FIGS. 5 to 7, the Malicious Software Detector 152 also or instead stores in its database 156 intended application permissions for particular applications. For example, the developer of the Agenda application 60 or a system administrator can inform the Malicious Software Detector 152 of the permissions that the Agenda application 60 is permitted to be granted. Such permissions are then stored in the database 156. When a user downloads the Agenda application 60 onto his or her mobile device 100, the Malicious Software Detector 152 transmits to the Security Decision Module 141 a message indicating the permissions that the Agenda application 60 is permitted to be granted. The Security Decision Module 141 can then use this information to instruct the Applications Control Module 140 to grant only the permissions indicated by the Malicious Software Detector 152.

For example, consider a situation in which an interloper infects the Agenda application 60 with malicious code that monitors the GPS data on the mobile device 100. Although during regular operation of the legitimate version of the Agenda application 60, the use of GPS data is not required, the infected version of the Agenda application 60 attempts to accesses this data. The developer of the Agenda application 60 registers the intended permissions with the Malicious Software Detector 152, which are stored in the database 156. These intended permissions do not include permission to access GPS data. When the infected Agenda application 60 is installed on the mobile device 100, the Agenda application 60 requests permission to access the user's GPS data. However, regardless of the permissions requested by the Agenda application 60, the Malicious Software Detector 152 transmits to the Security Decision Module 141 the intended permissions, and the Security Decision Module 141 instructs the Applications Control Module 140 to only grant the intended permissions to the Agenda application 60. Therefore, even though the infected version of the Agenda application 60 wishes to access GPS data, it is not granted this permission by the Applications Control Module 140. In this way, the effect of the malicious software is mitigated.

In variations of the embodiment described above, it is contemplated that a database for intended permissions can instead be stored directly on the user's device 100 and that the Security Decision Module 141 can access this database to directly obtain the set of permissions intended to be granted to an application. This may be the case particularly if there is ample memory space available on device 100. Advantageously, the Malicious Software Detector 152 can update this database by sending instructions to the device 100 to add and/or delete intended permissions.

In the embodiment described with reference to FIGS. 5 and 6, the Security Decision Module 141 performs a cryptographic hash of the application code and forwards this hash value to the Malicious Software Detector 152 for analysis. As mentioned earlier, advantageously, the hash is a relatively compact value that can be readily transmitted over the wireless network 200 to the Malicious Software Detector 152. It will be appreciated, however, that other information pertaining to the application code may be used instead of a cryptographic hash of the complete application code. For example, a hash of only a portion of the application code may be sent. As another example, the information pertaining to the application may not be a representation of the application code, but can instead be information based on the behaviour of the application during execution. Such an embodiment is shown with reference to FIG. 8.

Figure 8:
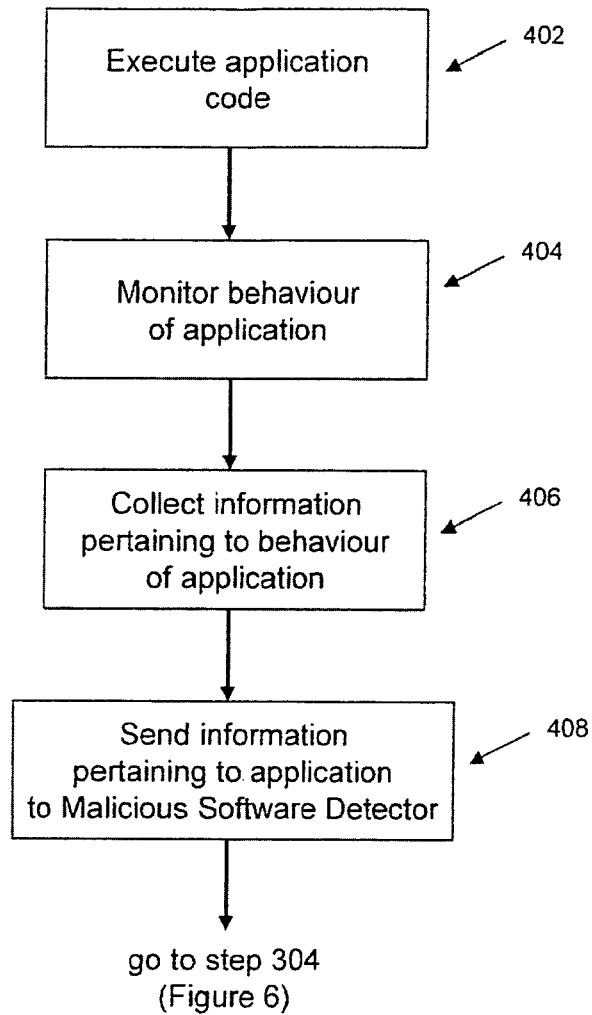
FIG. 8 is schematic diagram of a set of computer executable instructions for another embodiment for mitigating the effects of malicious software.

A set of computer readable instructions is shown in FIG. 8 that are stored on the mobile device 100 and are used by the Security Decision Module 141 during operation in this embodiment.

In step 402, the Security Decision Module 141 first runs the application at least once and monitors the behaviour of the application. To ensure the application is not unleashed onto the mobile device 100 without first checking for malicious software, the Security Decision Module 141 may run the application in a sandbox, i.e., using a program for executing unverified applications that typically provides only a tightly-controlled set of resources for the application to use while running.

Next, in step 404, the Security Decision Module 141 monitors the behaviour of the application. In step 406, the Security Decision Module 141 records information pertaining to the behaviour of the application. Such behaviour information can include, for example, the resources consumed by the application and/or the data and other applications accessed by the application.

Then, in step 408, the Security Decision Module 141 forwards the collected information to the Malicious Software Detector 152. The method then proceeds as described in steps 304 to 310 of FIG. 6.

In the embodiments described in FIGS. 4 to 8, the information pertaining to the application is forwarded to the Malicious Software Detector 152 for analysis. However, it is contemplated that in other embodiments, the Security Decision Module 141 has data locally stored in a memory 158 that may be used for making a determination as to whether the application has a malicious component. Such an embodiment is shown with reference to FIG. 9. The Security Decision Module 141 obtains information pertaining to the application, and instead of immediately forwarding this information to the Malicious Software Detector 152, the information is compared to locally stored data to determine if there is a match that identifies the application is malicious. For example, the Security Decision Module 141 may calculate a hash of the application code and compare it to locally stored virus signatures, which are stored on memory 158. If there is a match, then it is determined that the application is malicious and appropriate action is taken by the Security Decision Module 141. For example, the application can be quarantined, or depending on the characteristics of the virus (for example, if it is only semi-malicious), the Security Decision Module 141 can instead instruct the Applications Control Module 140 to inhibit certain permissions requested by and/or granted to the application.

However, if there is no match using the local data stored on memory 158, the information pertaining to the application is forwarded to the Malicious Software Detector 152 and operation proceeds as described in steps 304 to 310 of FIG. 6.

Advantageously, due to the provision of local data stored in the memory 158, the Security Decision Module 141 is able to detect malicious software without necessarily relying on the remote Malicious Software Detector 152. This is particularly advantageous in situations in which the mobile device 100 is not within range of the wireless network 200 and therefore the Security Decision Module 141 and the Malicious Software Detector 152 cannot exchange messages. In such a situation, the Security Decision Module 141 is still able to provide a certain level of protection against malicious software and is not completely dependent on the remote Malicious Software Detector 152.

Figure 9:
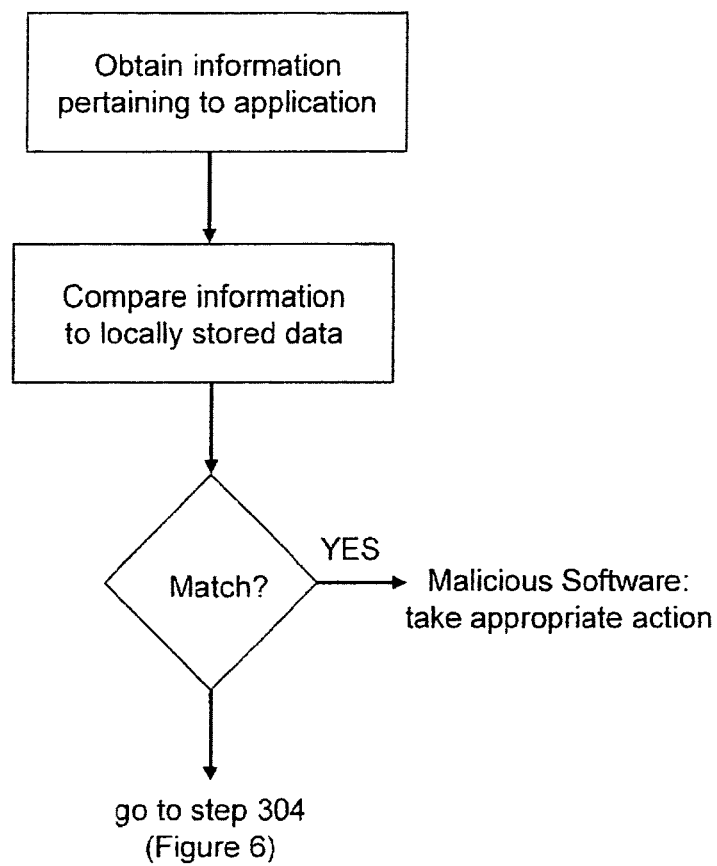
FIG. 9 is schematic diagram of a set of computer executable instructions for yet another embodiment for mitigating the effects of malicious software.

In a variation of the embodiment described in FIG. 9, the Malicious Software Detector 152 periodically automatically updates the data stored locally on the memory 158 of the Security Decision Module 141 in order to keep the data current and up to date.

Figure 10:
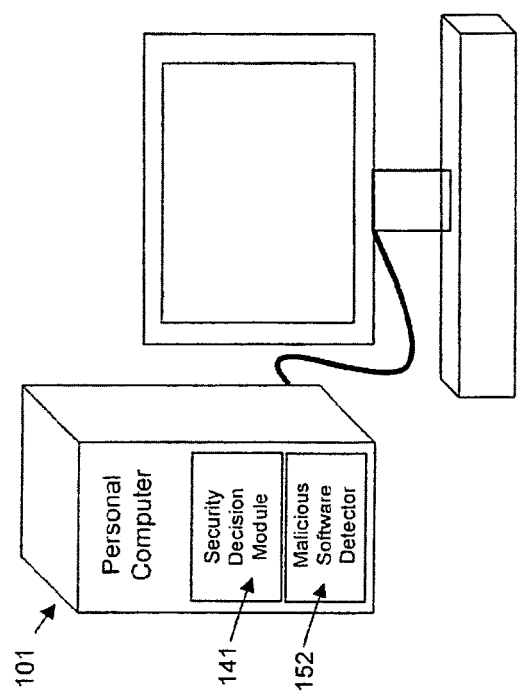
FIG. 10 is a schematic diagram of a personal computer illustrating another embodiment of system components for mitigating the effects of malicious software.

The embodiments described above assume that the Malicious Software Detector 152 resides on a server 154 remote from the mobile device 100. In these embodiments, the Security Decision Module 141 transmits to the Malicious Software Detector 152 information pertaining to the application, and the Malicious Software Detector 152 transmits back to the Security Decision Module 141 a message that indicates whether the application has a malicious component and (in some variations) the set of permissions that are to be granted to the application. It will be appreciated, however, that the Security Decision Module 141 may instead be stored on the device 100 itself, and that the Security Decision Module 141 may even be integrated as a component of the Malicious Software Detector 152. This may be the case particularly if the computing device is not a mobile device 100, as in the embodiments described above, but is instead a personal computer, such as a desktop or a laptop. Such an embodiment is shown in FIG. 10.

A computer 101 includes both the Security Decision Engine 141 and the Malicious Software Detector 152. The Malicious Software Detector 152 may comprise, for example, trusted $3^{rd}$ party software that is installed onto the computer 101. The Security Decision Engine 141 and the Malicious Software Detector 152 operate as described earlier, except that it is not necessary for the two components to communicate over a network since they reside on the same computer 101. In operation, the Malicious Software Detector 152 searches for malicious software using techniques known in the art. If malicious code is identified, or if it is determined that an application may be semi-malicious (e.g. have a malicious component), the Malicious Software Detector 152 notifies the Security Decision Engine 141. In some embodiments, the Malicious Software Detector 152 also provides the permissions to be granted to the application. The Security Decision Engine 141 then instructs the Applications Control Module 140 to modify the application permissions to grant only those indicated by the Malicious Software Detector 152.

It will be appreciated that in the embodiments described above, and in particular in the embodiment described with reference to FIG. 10, the Security Decision Engine 141 and the Malicious Software Detector 152 may be integrated as a single module. In this case, the module may be installed during manufacture of the computing device or may instead be subsequently purchased and installed by the user of the computing device.

Although the above principles have been described with reference to certain specific embodiments, various modifications thereof will be apparent to those skilled in the art without departing from the scope of the claims appended hereto.

The invention claimed is:

1. A method for mitigating the effects of a malicious software application on a computing device, the method being performed by a dedicated module located on the computing device, the method comprising:
    the dedicated module executing the application using a program for executing unverified applications, wherein the program provides a controlled set of resources for the application to use while executing;
    the dedicated module recording behavior information pertaining to a monitored behavior of the application;
    the dedicated module forwarding the behavior information to a malicious software detector remote from the computing device;
    the dedicated module receiving from the malicious software detector a message indicating that the application is malicious or has a malicious component; and
    in response to receiving the message from the malicious software detector, the dedicated module instructing software on the computing device that controls permissions of the application to inhibit at least one but not all permissions granted to the application.

2. The method of claim 1, wherein at least one permission is received from the malicious software detector.

3. The method of claim 1, wherein the dedicated module communicates with the malicious software detector through a wireless network.

4. The method of claim 1, wherein the behavior information comprises at least one of:
    a resource consumed by the application;
    data accessed by the application; and
    another application accessed by the application.

5. The method of claim 1, further comprising comparing the behavior information with data stored on memory on the computing device to determine if the application is malicious or has a malicious component.

6. A system for mitigating the effects of a malicious software application on a computing device, the system comprising:
    a dedicated module on the computing device comprising computer executable instructions for executing the application using a program for executing unverified applications, wherein the program provides a controlled set of resources for the application to use while executing, recording behavior information pertaining to a monitored behavior of the application, forwarding the behavior information to a malicious software detector remote from the computing device, and receiving from the malicious software detector a message indicating that the application is malicious or has a malicious component; and
    an applications control module on the computing device comprising computer executable instructions for controlling the permissions of the application, the dedicated module configured to instruct the applications control module to inhibit at least one but not all permissions granted to the application in response to receiving the message from the malicious software detector.

7. The system of claim 6, wherein at least one permission is received from said malicious software detector.

8. The system of claim 6, wherein the dedicated module and the malicious software detector are configured to communicate through a wireless network.

9. The system of claim 6, wherein the behavior information comprises at least one of:
    a resource consumed by the application;
    data accessed by the application; and
    another application accessed by the application.

10. The system of claim 6, further comprising memory on the computing device for storing data to be compared to the behavior information, the dedicated module being configured to compare the behavior information with said data to determine if the application is malicious or has a malicious component.

11. The system of claim 6, wherein the computing device comprises a mobile device.

12. A non-transitory computer-readable medium having stored thereon computer-readable instructions for mitigating the effects of a malicious software application on a computing device, the computer-readable instructions comprising instructions for:
    executing the application using a program for executing unverified applications, wherein the program provides a controlled set of resources for the application to use while executing;
    recording behavior information pertaining to a monitored behavior of the application;
    forwarding the behavior information to a malicious software detector remote from the computing device;
    receiving from the malicious software detector a message indicating that the application is malicious or has a malicious component; and
    in response to receiving the message from the malicious software detector, instructing software on the computing device that controls permissions of the application to inhibit at least one but not all permissions granted to the application.

13. The computer-readable medium of claim 12, wherein at least one permission is received from said malicious software detector.

14. The computer-readable medium of claim 12, further comprising instructions for communicating with the malicious software detector through a wireless network.

15. The computer-readable medium of claim 12, wherein the behavior information comprises at least one of:
    a resource consumed by the application;
    data accessed by the application; and
    another application accessed by the application.

16. The computer-readable medium of claim 12, further comprising instructions for comparing the behavior information with data stored on memory on the computing device to determine if the application is malicious or has a malicious component.

17. The computer-readable medium of claim 12, wherein the computing device comprises a mobile device.

* * * * *